(12) United States Patent
VerMeulen et al.

(10) Patent No.: US 7,629,592 B2
(45) Date of Patent: Dec. 8, 2009

(54) APPARATUSES, COMPONENTS AND METHODOLOGIES FOR DETERMINING SUITABILITY CONDITIONS FOR PLANT GROWTH

(75) Inventors: Kerry A. VerMeulen, Grand Rapids, MI (US); Cynthia V. VanRenterghem, Grand Rapids, MI (US)

(73) Assignee: Plumstone LLC, Grand Rapids, MI (US)

( * ) Notice: Subject to any disclaimer, the term of this patent is extended or adjusted under 35 U.S.C. 154(b) by 0 days.

(21) Appl. No.: 12/105,782

(22) Filed: Apr. 18, 2008

(65) Prior Publication Data
US 2008/0258078 A1   Oct. 23, 2008

Related U.S. Application Data

(60) Provisional application No. 60/912,558, filed on Apr. 18, 2007, provisional application No. 60/956,850, filed on Aug. 20, 2007.

(51) Int. Cl.
*G01J 1/38* (2006.01)
(52) U.S. Cl. .................................. 250/474.1
(58) Field of Classification Search ............... 250/474.1
See application file for complete search history.

(56) References Cited

U.S. PATENT DOCUMENTS

| | | | |
|---|---|---|---|
| 2,337,534 A | 12/1943 | Barber | |
| 2,782,088 A | 2/1957 | Davis, Jr. | |
| 3,779,651 A | 12/1973 | Gunlock | |
| 4,069,716 A | 1/1978 | Vanasco et al. | |
| 4,168,124 A | 9/1979 | Pizzi | |
| 4,212,535 A | 7/1980 | Sanders et al. | |
| 6,114,687 A | 9/2000 | Sharp et al. | |
| 6,132,681 A | 10/2000 | Faran | |
| 7,106,660 B2 | 9/2006 | Jenkins | |
| 7,271,887 B2 | 9/2007 | Bickel et al. | |
| 2003/0008409 A1 | 1/2003 | Spearman et al. | |
| 2005/0230598 A1 | 10/2005 | Hopkins et al. | |

FOREIGN PATENT DOCUMENTS

| | | | |
|---|---|---|---|
| EP | 476948 A2 * | 3/1992 | |
| JP | 02-0093222 | 1/1990 | |

\* cited by examiner

*Primary Examiner*—David P. Porta
*Assistant Examiner*—Marcus H Taningco
(74) *Attorney, Agent, or Firm*—Barnes & Thornburg LLP

(57) ABSTRACT

Mechanisms are provided to easily determining an indication of the amount of light available at a growing location over a given period of time. Such mechanisms may be used indoors or outdoors and are designed so as to provide an easily readable and understandable indication of the amount of light available at a growing location either empirically or with reference to a reference color chart.

13 Claims, 11 Drawing Sheets

APPARATUSES, COMPONENTS AND METHODOLOGIES FOR DETERMINING SUITABILITY CONDITIONS FOR PLANT GROWTH

This non-provisional patent application claims priority under 35 U.S.C. 119 to U.S. Provisional Application 60/912,558, filed Apr. 18, 2007 and U.S. Provisional Application 60/956,850 filed Aug. 20, 2007, both applications being incorporated herein by reference in their entireties.

The invention relates in general to a product and method for determining hours of available visible light, used for photosynthesis, that a growing location receives, as specified in the independent claims.

BACKGROUND OF THE INVENTION

Plant photosynthesis relies on energy in the visible light spectrum. The excitement of electrons in plants' leaves is activated by energy in the form of visible light from the sun. This electron energy is converted into Adenosine Triphos-Phate (ATP) and powers cellular respiration, i.e., the metabolic reactions and processes that take place in a cell or across the cell membrane to get biochemical energy from fuel molecules and the release of the cells' waste products.

The amount of direct sunlight needed to power respiration varies greatly from plant to plant. While many plants require up to six hours of direct sunlight a day during the growing season to thrive, the same light energy may harm a different species of plant, causing its failure. Knowing the difference in sunlight requirements is a basic component to successful gardening. Typically, a gardener will draw a map of their site, watch the sun pass throughout the course of a day, and make a diagram or rough sketch. However, this process is time consuming and inaccurate.

U.S. Pat. No. 3,779,651 to Gunlock, teaches the use of light-sensitive material having a filtered cover. A color change in the light-sensitive material relates to a reference color that has been printed on the substrate. Gunlock requires the use of a color reference for comparison of the activated material to determine the quantity of radiation which has been received. A legend is used to identify by color plants which may be suited for growing in the subject light environment. Gunlock also discloses a disc that has a small portion exposed in a window, so that a segment of the disc can be rotated into the exposure window position. Thus, a reference color is adjacent to the exposed disc area on a non-rotating surface. Gunlock also teaches the use of strips that may be exposed under a filter and placed adjacent to the printed reference colors.

Sunlight meters such as that disclosed in Gunlock have multiple component parts that must be manufactured (increasing cost) and assembled by a user (increasing complexity). Moreover, Gunlock is limited in that colors can only be analyzed with reference to reference color charts. Thus, such meters are subject to user error and costly to manufacture.

U.S. Pat. No. 4,168,124 to Pizzi describes the use of electronic sensors to detect and quantify the level of sunlight over a period of time. However, that disclosed methodology, while yielding accuracy, is too complex for everyday use for a large number of applications.

U.S. Pat. No. 2,337,534 to Barber similarly teaches a disc or sheet of photosensitive paper that darkens when exposed to light for monitoring exposure of book pages. However, Barber's invention is suitable for brief exposures lasting only a few seconds, and an exposure level is determined by the intensity of the blackening of the photographic light sensitive paper. As such, utilization of the Barber device is measuring light intensity rather than duration.

U.S. Pat. No. 6,132,681 to Faran et al. similarly teaches a disposable dosimeter for measuring human exposure to ultraviolet radiation. Although Faran teaches the use of at least one active chemical for color change measurement at higher temperatures, Faran is disadvantageous as it is measuring human exposure to ultraviolet radiation.

SUMMARY OF THE INVENTION

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to the more detailed description below.

In accordance with at least one embodiment of the invention, apparatuses, components and methodologies are provided that enable the determination of the amount of available light, used for photosynthesis, that a growing location receives, as specified in the independent claims. This is achieved by a combination of features recited in each independent claim. Accordingly, dependent claims prescribe further detailed implementations of the present invention.

BRIEF DESCRIPTION OF THE DRAWINGS

A more compete understanding of the present invention and the utility thereof may be acquired by referring to the following description in consideration of the accompanying drawings, in which like reference numbers indicate like features, and wherein.

DETAILED DESCRIPTION OF THE INVENTION

Figure 1:
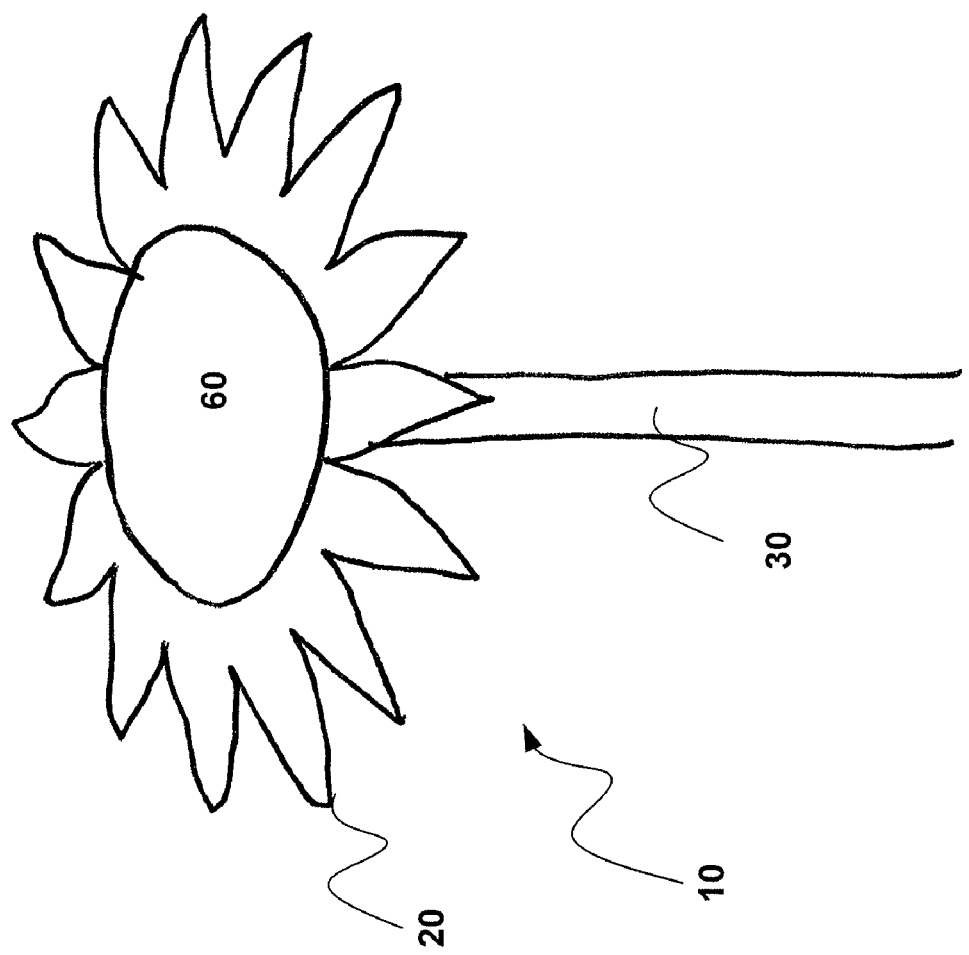
FIG. 1 illustrates a side elevational view of a light reactive meter unit designed in accordance with an illustrated embodiment.

In the following description of various invention embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope and spirit of the present invention.

As recognized conventionally, plant photosynthesis relies on energy in the visible light spectrum. The excitement of electrons in plants' leaves is activated by energy in the form of visible light from the sun. This electron energy is converted into ATP and powers cellular respiration. Plant cells use pigments, primarily chlorophyll and carotenoids, to detect the presence of light. These plant pigments are active in wavelengths of the visible light range, specifically indigo-blue (400-475 nm) and red (640-680 nm) for chlorophyll. Carotenoids expand the range of blue light absorption with activity between 450 and 500 nm.

Blue light in the range of 430 to 480 nm is absolutely required to stimulate the chemical changes necessary to make chlorophyll. For maximal chlorophyll biosynthesis in angiosperms (flowering plants), it is thought that illumination with blue light is required.

As the amount of direct sunlight needed to power respiration varies greatly from plant to plant, knowing the difference in sunlight requirements is a basic component to successful gardening. Conventionally, gardeners draw a map of their site, watch the sun throughout the course of a day, and make a diagram or rough sketch. However, this process is time consuming and inaccurate. Moreover, many variations can add to the complexity of a site and render visual measurements difficult. These variations include but are not limited to: changing seasonal foliage in upper story trees, the changing effect of building shadows, changes in seasonal sunlight, and shadows from nearby plants or shrubs (varying in growth throughout a growing season). Thus, without a tool to denote hours of sunlight received in a location, a gardener is left to make a best guess.

Various types of utility may be provided by illustrated embodiments including assisting gardeners select and arrange plants in one or more growing locations according to plants' needs. This will reduce failed planting due to improper light for photosynthesis because too much or too little visible light is detrimental to plant growth and health. As a result, illustrated embodiments may aid the gardener in selecting, planning, and designing their garden site(s) including one or more growing locations.

Thus, illustrated embodiments of the invention provide an apparatus, which could be used by landscape architects and planners, lawn and garden industry personnel, or the "do-it-yourself" home gardener to determine the amount of light exposure a growing location receives in a day. Growing locations, as that term is used in this description, may refer to a particular area of a lawn, garden, or room location and may include exterior and/or interior growing locations. As a result of determining the amount of light exposure, determined light exposure levels may be used to determine the types of plants that would do well in a particular growing location.

Thus, in accordance with an illustrated embodiment, a determination of the total amount of sunlight available at a gardening site is possible without the use of calculations, graphs or expensive equipment. Accordingly, an illustrated embodiment removes variable guesswork that results in costly plant failures and lost growing opportunities.

Conventionally, gardeners may wait for years for a plant to thrive in a particular growing location without knowing whether basic requirements are being met including soil pH, moisture requirements, temperature ranges or sunlight requirements. There are many variables to consider for successful plant growth and it can be difficult for a gardener to determine why a plant has failed, therefore repeating the same mistake with a different plant. Moreover, often, gardeners are unable to determine whether a plant's failure to thrive results from a deficiency of one or more than one of these basic requirements without trial and error. Soil composition and moisture requirements can be varied by the application of soil supplements and fertilizers and varying watering regimes, respectively. However, determining whether the amount of sunlight is to blame generally requires relocation of a plant from a present location which, depending on whether the plant is in-ground or in a pot or planter, can be labor intensive and potentially detrimental to the plant.

An illustrated embodiment may be used as a diagnostic tool for existing plantings to determine, if a plant is not thriving, if improper light levels are the cause.

Gardeners are generally interested only in the amount of visible light available at a growing location. This is because it is only by using radiant energy in the visible light spectrum of 400 to 700 nm that plant photosynthesis can occur. Thus, at least one illustrated embodiment measures the amount of visible light or the total amount of light (including UltraViolet (UV) light). However, at least one illustrated embodiment may measure the amount of UV light (as that amount may be indicative of a corresponding amount of visible light, taking into account or ignoring variations based on such factors as altitude, latitude and pollution).

An illustrated embodiment indicates an amount of light using a light reactive ink that changes color in response to exposure to light over a measured period of time. The color change may occur in or on a light reactive meter unit positioned at a growing location at the beginning of a day and left intact until late afternoon. The color of the light reacting ink at the end of the day is indicative of how much visible light the growing location has received in one day.

Figure 2:
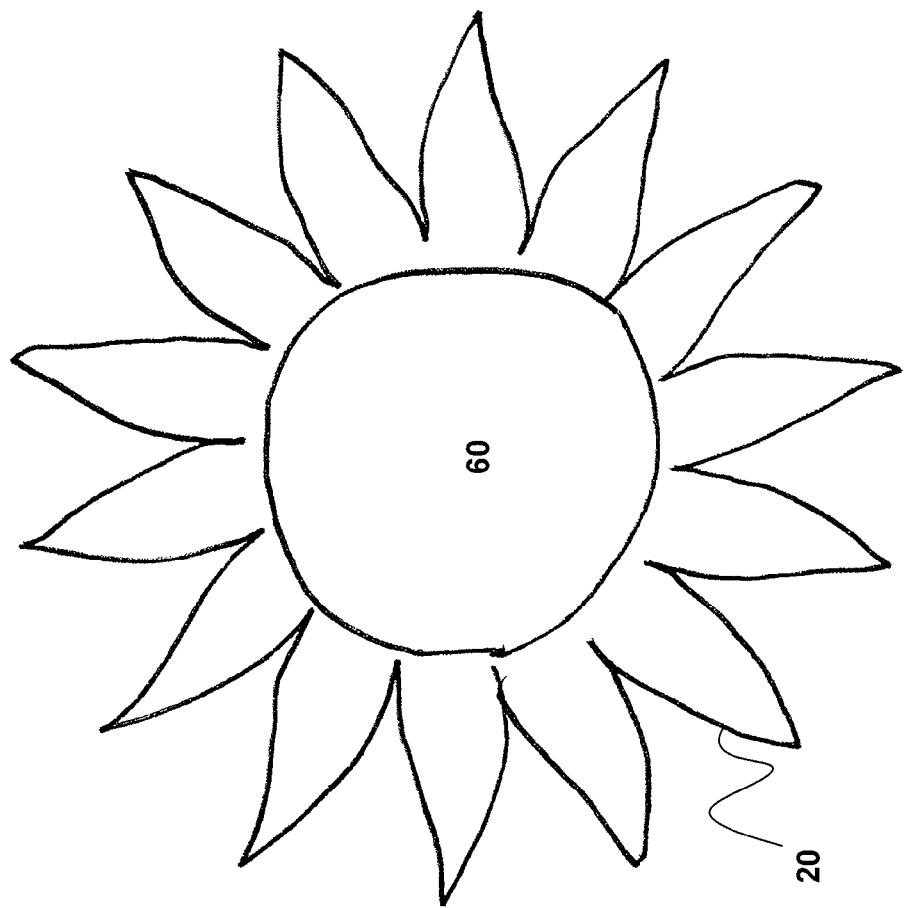
FIG. 2 illustrates a top view of a light reactive meter unit designed in accordance with an illustrated embodiment.

In accordance with at least one illustrated embodiment, the light reactive ink may be incorporated in an adhesive sticker that may be applied to a receptacle, e.g., a plastic holder such as that illustrated in FIGS. 1-2. Such a holder may be manufactured by being molded, cast or pressed.

Figure 4:
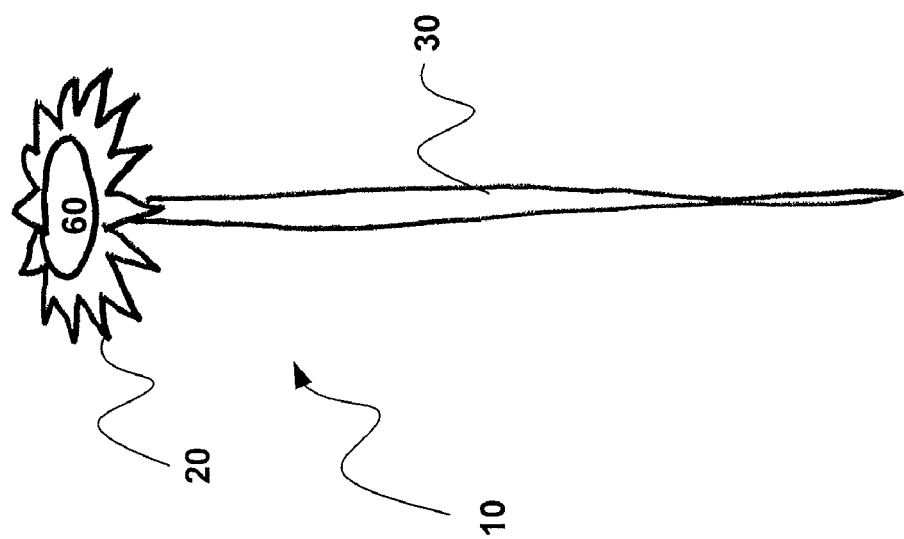
FIG. 4 illustrates a side elevational view of a light reactive meter unit designed in accordance with an illustrated embodiment.
Figure 7:
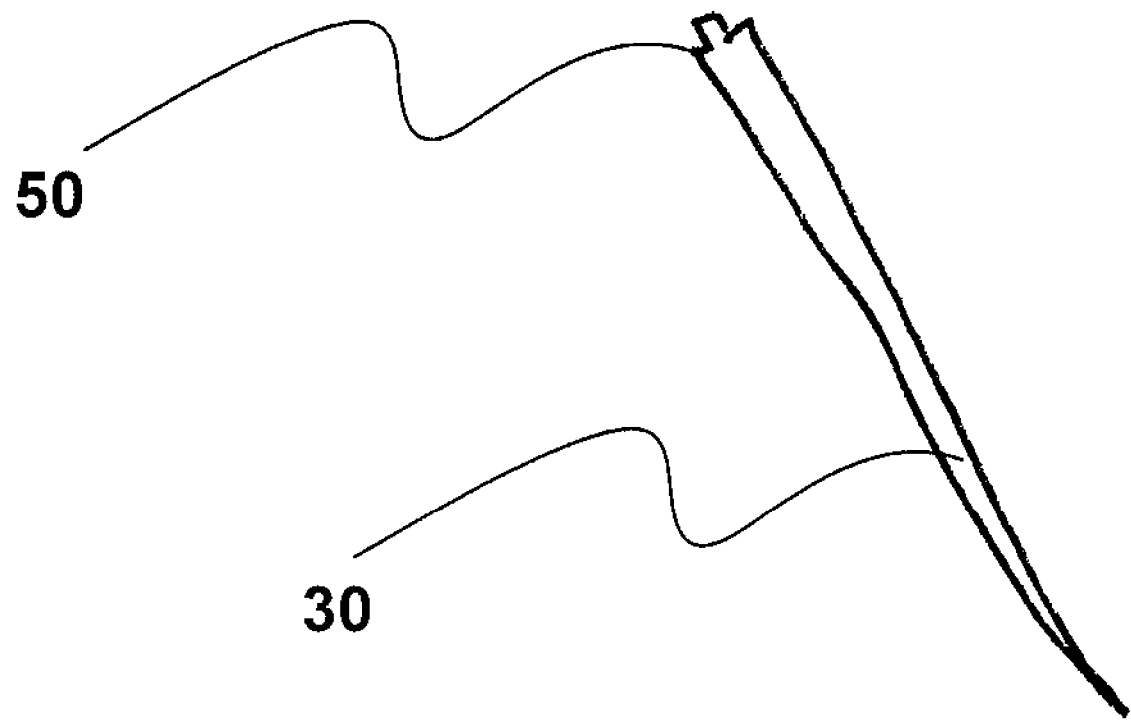
FIG. 7 illustrates a side view of the stem member component of a light reactive meter unit designed in accordance with an illustrated embodiment.

In FIGS. 1-2 and 4, the light reactive meter unit 10 may include a substantially planar member 20 and a stem member 30. The substantially planar member 20 may be coupled to the stem member 30 by, for example, inserting one end of the stem member 40 (as illustrated in FIG. 7) in an aperture 50 (as illustrated in FIG. 2 provided substantially in the center of the substantially planar member 20).

An adhesive sticker 60 including light reactive ink may be affixed to the substantially planar member 20 and include or be coated with an adhesive (e.g., dry—requiring application of water to be activated, or self-adhesive) on the other side so as to be affixable to the substantially planar member 20.

Figure 3:
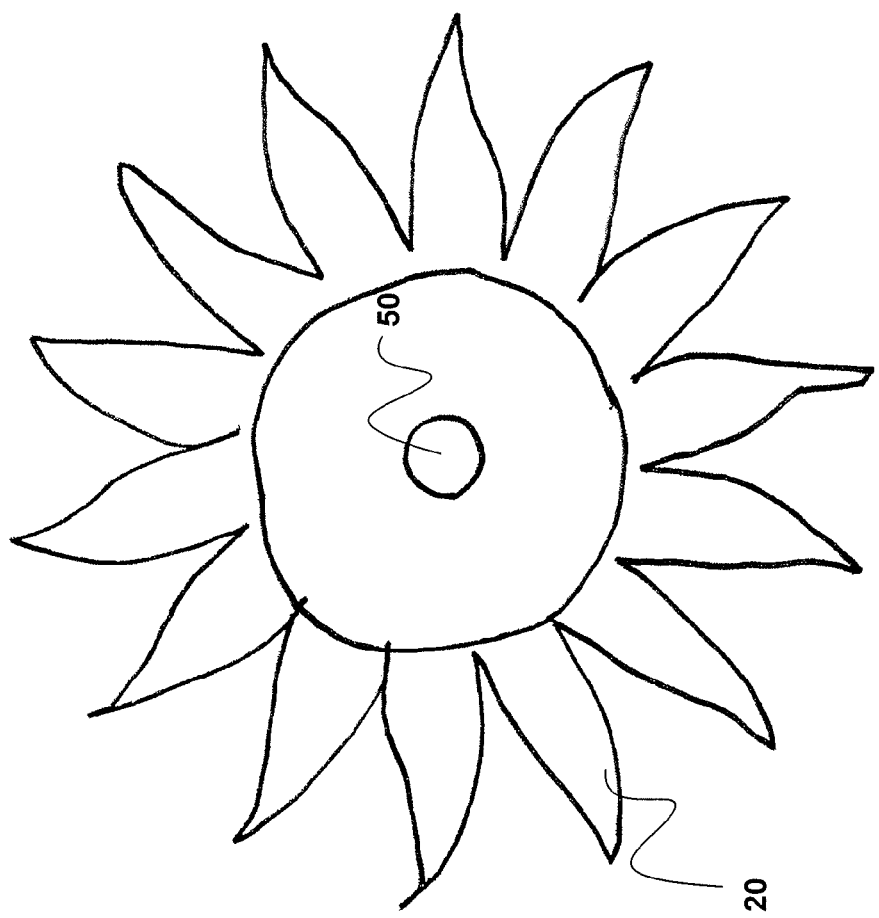
FIG. 3 illustrates a bottom view of the substantially planar member component of a light reactive meter unit designed in accordance with an illustrated embodiment.

The substantially planar member 20 may serve as a surface upon which the adhesive sticker 60 may be applied, as illustrated in FIG. 3. Thus, the adhesive sticker 60 is applied to a side of the substantially planar member 20 that may be opposite to that upon which the aperture 50 is located. Alternatively, if the aperture 50 is designed to traverse the entire thickness of the substantially planar member 20, the adhesive sticker 60 may be placed on either substantially planar surface of the member 20.

With the configuration of the light reactive meter unit 10 illustrated in FIG. 1, the adhesive sticker 60 may be placed in a horizontal or substantially horizontal position by inserting the stem member 10 into the ground or in soil provided in a plant container at a growing location. Theoretically, this positioning should provide the maximum measurement efficiency by enabling complete exposure of the light reactive ink to a maximum amount of available light at a growing location.

Figure 5:
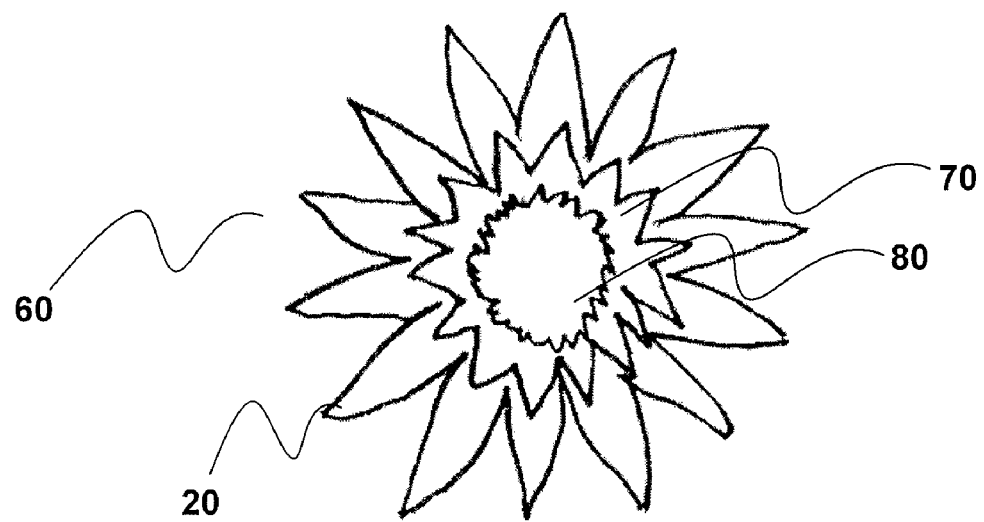
FIG. 5-6 illustrate top views of light reactive meter units designed in accordance with illustrated embodiments.
Figure 6:
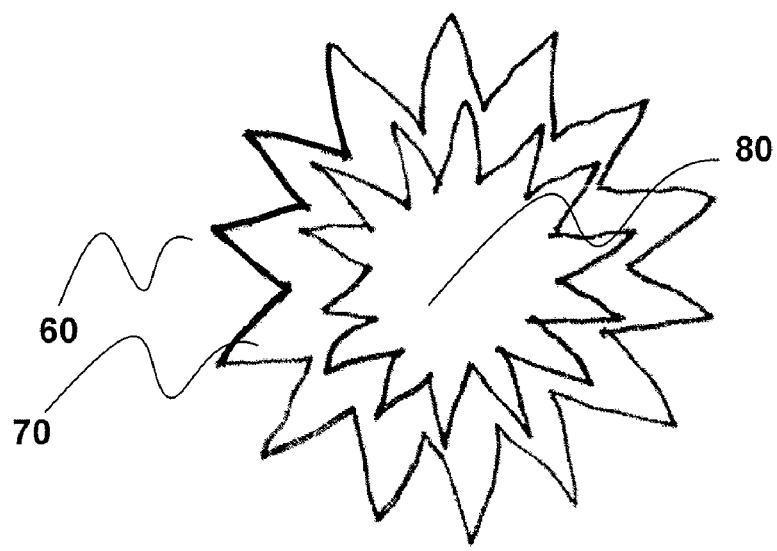

FIGS. 5-6 illustrate alternative configurations of an adhesive sticker 60 illustrated in combination with substantially planar member 20. As illustrated in FIG. 5, the adhesive sticker 60 may be affixed to the substantially planar member 20. In one configuration the adhesive sticker 60 may be comprised of two separate portions: an outer section 70 and an inner section 80. Various alternative compositions of this configuration of adhesive sticker 60 may be provided. For example, the inner section 80 may include the light reactive ink while the outer section may include reference color samples, e.g., on the exterior pedals of the flower shape, as illustrated in FIG. 6. Alternatively, the inner section 80 may include light reactive ink configured particularly for interior testing (explained herein) while the exterior section 70 may include light reactive ink configured particularly for exterior testing or vice versa.

In use, the light reactive meter unit may be positioned at a growing location at the beginning of the day and left in place until late afternoon. For best results, the light reactive meter unit may be used to determine the amount of available light on a sunny day (i.e., with little to know cloud cover) to ensure that the maximum amount of light is tested at a growing location. This is because an overcast day will, theoretically, produce test results that are lesser than those produced on a clear day.

Figure 9:
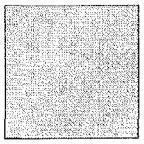
FIG. 9 illustrates an example of a reference color chart that may be utilized to determine fine measurements in accordance with illustrated embodiments.

The color of the light reactive ink at the end of the day will be indicative of how much light has been received at that growing location. The amount of light received will be indicated by the resulting color of the light reactive ink in the adhesive sticker 60; the color will correspond to a reference color chart (such as that illustrated in FIG. 9; note the example colors illustrated in FIG. 9 are pertinent to light reactive ink configured for measuring interior light). As shown in FIG. 9, a pre-exposure color may be, for example, RGB (Red-Green-Blue code under the RGB color model) 139 0 0, post thirty minute exposure may be, for example, RGB 206 92 92, post one hour exposure may be, for example, RGB 244 164 96, post two hour exposure may be, for example, RGB 255 218 185, post three hour exposure may be, for example, RGB 255 222 173, post four hour exposure may be, for example, RGB 238 220 130, and post six hour exposure may be, for example, RGB 240 230 140. Thus, the colors shown correspond to the amount of light in the growing location identified by the time period of light intensity and/or classify the growing location as either sunny, part-sunny, part-shady, or shady.

The light reactive ink may be readable either empirically (i.e., without reference to a reference chart) or by matching the resulting color of the reactive ink with a reference color chart. Moreover, the light reacting ink may be both empirical and readable with reference to a reference color chart, e.g., when a resulting colors of the reactive ink may be primary colors (e.g., red, yellow, blue and green) in association with gross levels of light intensity (e.g., high, medium, low, or none/unexposed). Thus, the crude results of a light intensity test may be read by a user without reference to a color chart.

Figure 8:
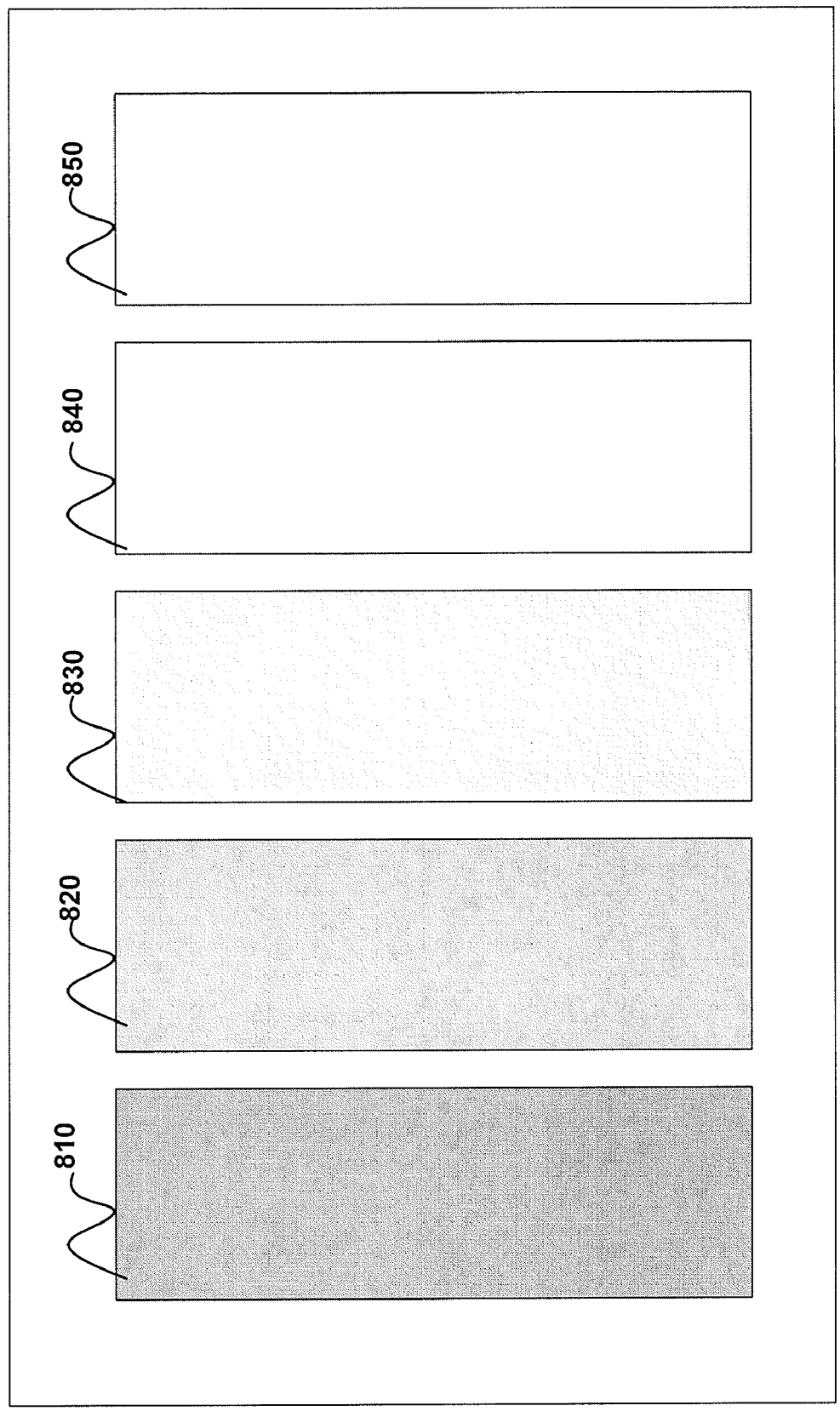
FIG. 8 illustrates an example of resulting color samples for light reactive ink utilized in accordance with illustrated embodiments.

In accordance with at least one illustrated embodiment, a user may determine the time duration of available light, available for plant photosynthesis, that a growing location receives. The measured amount of light may be determined in order to growing location as sunny, part-sunny, part-shady, or shady. Light exposure classifications may be indicated using a light reactive ink that changes color from: (1) red (e.g., RGB 139 0 0) to light red (e.g., RGB 205 91 69) to (2) orange-red (e.g., RGB 255 69 0) to orange (e.g., RGB 255 165 0) (3) to yellow (e.g., RGB 255 255 0) over approximately eight hours (see for example, resulting colors 810-850 of light reactive ink illustrated in FIG. 8). The user can determine the degree of light intensity at a gross level by simply observing the resulting color of the light reactive ink following a period of light exposure.

Alternatively, as illustrated in FIG. 9, a fine level determination, i.e. a more precise determination, of the degree of light intensity may be provided by the user comparing the resulting color with a color reference chart such as chart 900 illustrated in FIG. 9. The use of reference color chart 900 with which light reactive ink color changes may be compared to indicate measurement should involve at least two hours of testing time. In the example chart 900, reference colors are provided for light intensity of at least two hours, at least four hours, at least six hours, at least eight hours.

In accordance with at least one illustrated embodiment, the light reactive ink may utilize fugitive colors, which enable the measurement of light based on a degree of fading of the fugitive colors. More specifically, fugitive colors fade in light to reveal the colors or pigments underlying a top color. Thus, producing light reactive ink based on fugitive colors can be achieved by combining stable and unstable dye chemistries mixed together in a single medium. Rhodamine, a xanthene, and similar conventionally known chemistries may be used.

In accordance with at least one illustrated embodiment, different levels of rhodamine may be mixed with generic yellow dyes, and antioxidants and/or UV inhibitors, titanium dioxide or other opacifiers to provide the light reactive ink. Additionally, chrysoidine can also be used. The medium upon which the light reactive ink may be applied may be, for example, any substrate that does not interfere with the light reactive functionality of the ink. Optionally, additional chemistries may include in the light reactive ink to prevent degradation of resulting color as a result of exposure to high intensity light and/or temperatures associated with chemical reactions present in the light reactive ink.

In illustrated embodiments, the light reactive ink may be formulated with an aniline-based dye that responds to light with a tetraphenyldiaminobiphenyl group that enables electrons to move freely through the structure. The dye may then be solubilized and mixed with color-enhancing agents designed to increase the intensity and appearance. A resulting chemical component, which may be a polymer, may then be applied to a reactive medium overlaid with a colorfast, nonreactive pigment. Once dry, the light reactive medium may also be coated with a laminate to reduce exposure to light by the chemical component. Thus, incorporation of such a laminate to slow down light reactivity of the photosensitive reaction to a controlled rate.

It should be appreciated that, during the light reactive ink's exposure to light, the light reactive, i.e., photosensitive, dye molecules interact chemically with other ink ingredients overlaid onto the medium, such as a stable, nonreactive, pigmented ink.

As illustrated embodiments of the invention utilize light reactive ink rather than temperature sensitive materials to determine light intensity, the light reactive meter unit provides light intensity measurements that are not temperature sensitive. As a result, the light reactive meter unit may be used throughout all seasons to determine the available light at a growing location.

In accordance with at least one illustrated embodiment, the light reactive meter unit 10 may be particularly configured for testing or monitoring light intensity for indoor growing locations for proper placement of plants inside a home, office or other indoor location. Thus, in such an interior use specific design, one potential breakdown of light intensity amounts may be as follows: 200 foot candles (fc)=low light intensity; 200-500 fc=medium light intensity; and 500-2000 fc=high light intensity.

In accordance with such an interior use specific embodiment, the media for the light reactive ink (e.g., the adhesive sticker 60 illustrated in FIG. 1 or FIGS. 10-14) may be, for example, a colorless ink that, upon exposure to light, grows in color intensity from: (1) clear to light pink, (2) to medium pink to (3) light purple to (4) deep purple or violet (5) to dark violet. These color changes would correspond to an increase in the amount of light to which the ink was exposed over a period of time, e.g., the entire or majority of daylight hours. Accordingly, the user could determine the degree of light intensity at a gross level by simply observing the color of the light reactive ink following a period of light exposure. Alternatively, or in addition, a fine level determination of the degree of light intensity may be provided by the user comparing the resulting color with a reference color chart in much the same way as the user could reference the color chart illustrated in FIG. 9 for the outdoor use specific design.

In the embodiment illustrated in FIG. 1, a user need only replace the adhesive sticker 60 (containing light reactive ink), with a non-exposed sticker to perform a new test at a same growing location or another growing location.

Therefore, it may be understood that the invention contemplates the provision and use of light reactive meter unit to determine the amount of light a growing location receives in a given time, thus providing the sunlight equivalent of a "rain gauge," measuring precipitation over a period of time, e.g., a period of several hours.

In at least one illustrated embodiment, the light reactive ink may provide color coding to distinguish between exposure rates, e.g., one color for full sun, a color change for part shade, part sun, or shade. Such exposure rates would ideally correspond to a graduated color change that when observed empirically or compared to a reference color chart would provide users with an indication of the cumulative hours of light received at a growing location.

Thus, although illustrated embodiments may function to identify the quantity of light available in a given growing location for comparison to the amount of light required by a variety of plants, at least one alternative embodiment provides a single light reactive medium (e.g., a single adhesive sticker or perhaps a single set of stickers) including light reactive ink customized to provide an indication of whether a growing location provides sufficient light for the plant variety. In such an embodiment, the light reactive ink could be placed in a potential growing location to determine whether the potential growing location would be suitable for the given plant variety based on the amount of available light.

Figure 11:
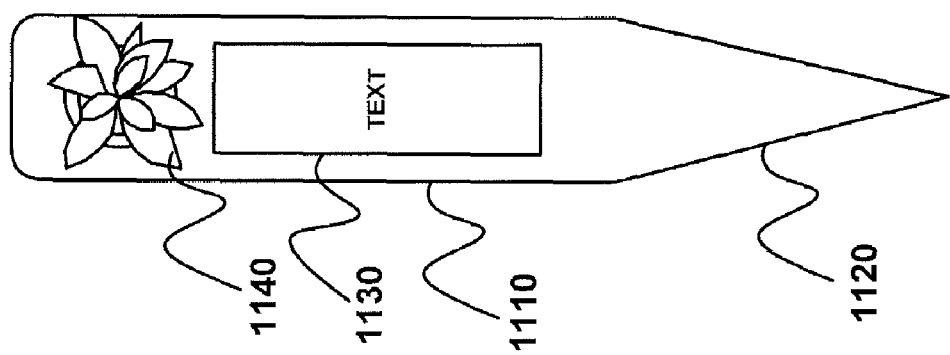
FIG. 11 illustrates an example of a plant insert configured in accordance with an illustrated embodiment.
Figure 10:
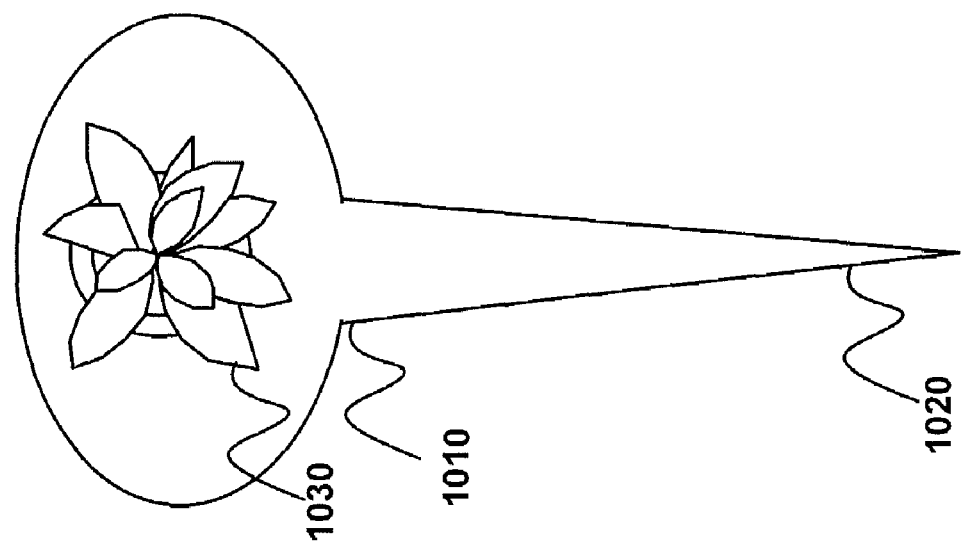
FIG. 10 illustrates an example of a plant insert configured in accordance with an illustrated embodiment.

Accordingly, as illustrated in FIGS. 10-14, various alternative configurations may be provided for light reactive metering units and included adhesive stickers. For example, as illustrated in FIGS. 10 and 11, a plant insert may be provided in potted plants for sale. Such a plant insert, e.g., plant insert 1010 may include a stem member 1020 and a main body member. When the plant insert 1010 is included in a medium sized potted plant container, e.g., 6" diameter pot, the insert may be removed from the soil of the potted plant container and placed horizontally on a surface where the user is planning on positioning the plant. This positioning would position the light reactive ink 1030 normal to the horizontal surface, which may provide the most optimal configuration for measuring available light.

Likewise, as illustrated in FIG. 11, the plant insert 1110 may include a stem member 1120 that may be positioned in the soil of a potted plant. Additionally, the plant insert may include plant information in text 1130, including for example, identification of plant variety, planting and watering instructions, light requirements etc. Furthermore, the plant insert may include the light reactive ink 1040. Optionally, the plant inserts may also include a reference color indicating the light requirements for the particular plant so that, once the user performs the light reactive test, the user may compare the test results with the color indicating the necessary light requirements.

Figure 13:
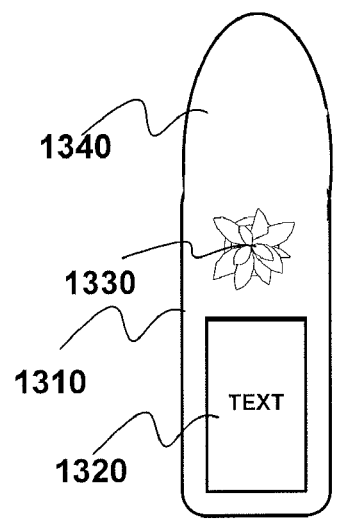
FIG. 13 illustrates an example of a plant tag configured in accordance with an illustrated embodiment.

Similarly, as illustrated in FIG. 13, plant tags may be configured with similar functionality and features. Such plant tags may be useful as plant identifiers for attaching to plants themselves or to hangers for such plants, e.g., when plants are sold in hanging planters. Accordingly, in an illustrated embodiment, plant tag 1310 may be provided that includes a textual description 1320 similar to that disclosed in connection with FIG. 14. Additionally, the plant tag 1310 would also include the light reactive ink 1330 and a slotted aperture 1340 to enable the tag 1310 to be hung on the plant or plant container.

Figure 12:
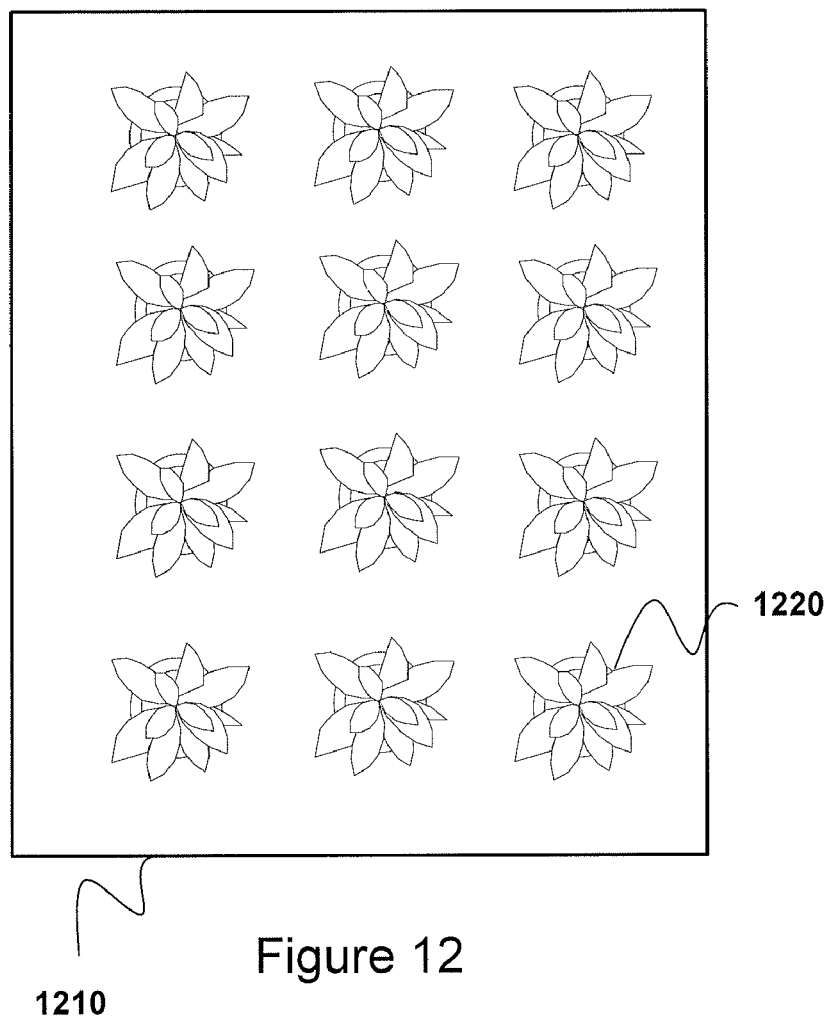
FIG. 12 illustrates an example of a lot of adhesive stickers provided in accordance with an illustrated embodiment.

Alternatively, lots of light reactive ink quantities may be provided on a single sheet 1210 as illustrated in FIG. 12. In such an implementation, the light reactive ink quantities 1220 may be formed on adhesive stickers or on some other media in which the user may cut out the quantities 1220 as they are needed to perform tests. Such sheets 1210 may be provided as a product for sale or be used as promotional materials for a brand, company, product, event, etc. In such an implementation, it should be appreciated that the light reactive quantities 1220 may be in the form of and/or colored as commercial or event trademarks or logos or the like. Furthermore, in such an implementation a back side of the sheet 1210 (not shown) may also include reference color charts for comparison with test results.

Additionally, it should be appreciated that the embodiment illustrated in FIG. 1 may utilize adhesive stickers 60 that may be sold in packets such as the lot 1210 illustrated in FIG. 12.

Figure 14:
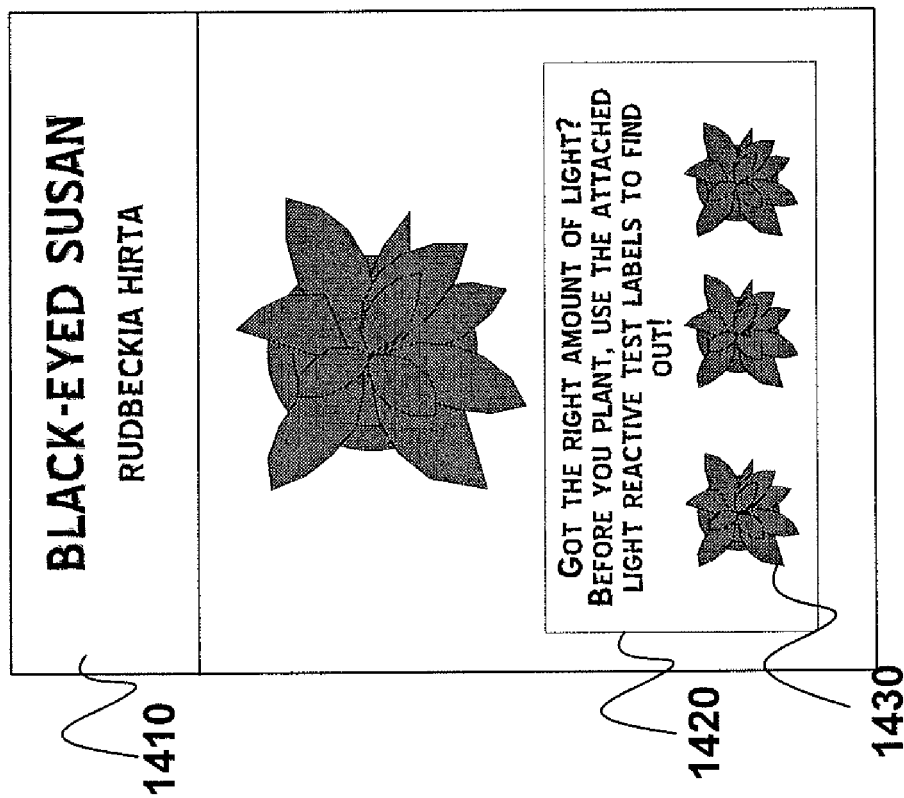
FIG. 14 illustrates an example of adhesive stickers provided with containers of seeds.

Further, as illustrated in FIG. 14, quantities of light reactive ink 1430, e.g., provided as self adhesive stickers, may be included with or attached to containers of seeds 1410 with promotional or instructional text 1420.

While this invention has been described in conjunction with the specific embodiments outlined above, it is evident that many alternatives, modifications and variations will be apparent to those skilled in the art. Accordingly, the various embodiments of the invention, as set forth above, are intended to be illustrative, not limiting. Various changes may be made without departing from the spirit and scope of the invention.

For example, optionally, the adhesive sticker 60 illustrated in the various figures may also include a water proof or water resistant coating over the light reactive ink so as to improve the durability of the adhesive sticker 60.

Further, depending on the location of the light reactive ink the packaging the ink is provided in, and the configuration of the light reactive meter units, there may be a need for the light reactive ink quantity to be covered by a light blocking coating or film (e.g., an opaque overlay or overlay capably of preventing the light reactive ink process, to ensure that the light reactive ink is not activated prior to when the user intends activation to occur. In particular, with reference to the quantities of light reactive ink illustrated in FIGS. 12 and 14, that film or coating may be perforated so as to provide the user with the ability to remove only the film or coating over a single quantity of light reactive ink. Moreover, with reference to the configurations illustrated in FIGS. 5 and 6, if more than one type of ink configuration is included on an adhesive sticker, such a film may be removable so as to leave one section covered while the other section(s) is exposed to light; such a configuration may be of particular use if a user is contemplating whether to plant a plant variety outside or indoors.

When the invention is in the form insertable into the ground (such as illustrated in FIG. 1), the stem may be telescopic or otherwise extendable between a compact length, such as for ease of packaging, to one or more extended lengths. The stem may further be extendable to a desired height above a ground surface such that the light reactive ink is located at a preferred position to obtain an accurate indication of sunlight conditions. Further, the height of the stem can be adjusted according to the height of a plant desired for a growing location. Additionally, the ability to vary the height of the stem may also be used to determine light conditions as a function of distance from the ground. As a result of this determination, plants of suitable height for a growing location may be determined.

The light reactive ink may be configured so as to allow for exposure to light over a period of several days for a potentially more accurate measurement. Such an embodiment may be of particular utility in a growing location that is susceptible to fast moving afternoon storms. Because afternoon sun tends to be intense, such storms would affect the results of a light intensity test. This would be a particular problem if a number of tests were being run in different growing locations and were left unattended by a user; in such a situation, the user might not be in a position to discontinue a test even though the results of the test would be skewed by fast moving, interrupting weather.

Additionally, although not illustrated, in accordance with at least one illustrated embodiment, the light reactive meter unit may also include a repository for test strips for measuring soil pH, an apparatus or test strips for measuring or monitoring soil moisture, soil nitrate content, other mineral content including nitrogen, phosphorus, potassium, and/or soil type indications which may be classified according to standardize and/or various soil classifications such as clayey, sandy, loamy, or other combinations of soil composition. For example, such a repository may be provided as an addition or as part of the stem 30 illustrated in FIG. 1. Alternatively, such a repository may be included in an auxiliary member that may be inserted in the ground and, for example, may include an aperture for the stem 30 illustrated in FIG. 1.

Moreover, the invention also contemplates the application of an ink or paint form that can be sprayed over an area and yield a visual indication of the light intensity and/or hours of light received over a more broad area than that provided by illustrated embodiments described herein.

As a result, it will be apparent for those skilled in the art that the illustrative embodiments described are only examples and that various modifications can be made within the scope of the invention as defined in the appended claims.

The invention claimed is:

1. An apparatus enabling a determination of the amount of available light at a growing location, the apparatus comprising:

means for providing a quantity of light reactive ink, the light reactive ink including fugitive colors which change color in response to exposure to light over a measured period of time, wherein the means for providing a quantity of light reactive ink is an adhesive sticker; and means for holding the provided quantity of light reactive ink at a growing location, wherein the means for holding includes a substantially planar, plastic member and a plastic stem member, the plastic stem member being configured to be inserted in an aperture included in the substantially planar, plastic member, wherein a gross color change of the quantity of light reactive ink is reversible and the gross color change is readable without reference to a reference color chart, wherein the means for providing a quantity of light reactive ink includes a removable film that blocks light from exposing the quantity of light reactive ink to prohibit the light reactive ink from reacting to light while the film is covering the quantity of light reactive ink and the adhesive sticker includes an adhesive backing provided on one side of the adhesive sticker with the quantity of light reactive ink being provided on the other side of the sticker, and wherein the adhesive sticker is applied to the planar member on a side of the substantially planar, plastic member opposite from the aperture provided for receiving the plastic stem member and, wherein a configuration of the apparatus provides a structure that includes the substantially planar, plastic member coupled to the adhesive backing of the adhesive sticker, which is provided below the quantity of light reactive ink provided on the opposite side of the adhesive sticker and which is provided below the removable film affixed to the quantity of light reactive ink.

2. The apparatus of claim 1, wherein the means for providing a quantity of light reactive ink includes a plurality of sections, each section including alternate light reactive ink configurations.

3. The apparatus of claim 2, wherein the plurality of sections include a section including light reactive ink configured for metering outdoor light exposure.

4. The apparatus of claim 2, wherein the plurality of sections include a section including light reactive ink configured for indoor light exposure.

5. The apparatus of claim 1, wherein the means for providing a quantity of light reactive ink includes a plurality of sections, one of the sections including light reactive ink and another section including reference color results for comparison with the light reactive ink post metering.

6. The apparatus of claim 1, wherein the light reactive ink changes colors based on an amount of light exposure over a period of time.

7. The apparatus of claim 1, wherein the light reactive ink changes colors that indicate a number of hours of sunlight available at a growing location.

8. The apparatus of claim 1, wherein the light reactive ink changes colors that indicate whether a growing location is sunny, part-sunny, part-shady, or shady.

9. The apparatus of claim 1, wherein the light reactive ink changes from red to yellow over exposure to light over approximately eight hours.

10. A receptacle holding a plurality of quantities of light reactive ink to be used for determining an amount of available light at one or more growing locations, the receptacle comprising:

a front portion including the plurality of light reactive ink quantities each provided on adhesive stickers temporarily affixed upon the front portion by a layer of adhesive, wherein the light reactive ink includes fugitive colors which change color in response to exposure to light over a measured period of time, said color change being irreversible;

a removable film temporarily affixed to the front portion over the plurality of light reactive ink quantities, the film blocking light from exposing the quantities of light reactive ink so as to prohibit each of the light reactive ink from reacting to light while the film is covering the quantities of light reactive ink, the removable film being configured so as to enable removal of only a portion of the film specific to one of the plurality of light reactive ink quantities at a time; and a back portion of the receptacle including information regarding the light reactive ink quantities, wherein a configuration of the receptacle provides a structure that includes the quantities of light reactive ink provided between the front portion and the removable film affixed to and covering the quantities of light reactive ink.

11. The receptacle of claim 10, wherein the removable film blocks light from exposing the quantities of light reactive ink.

12. The receptacle of claim 10, wherein the back portion includes instructions for using the light reactive ink to determine an amount of available light at a growing location.

13. The receptacle of claim 10, wherein the back portion includes reference color results for comparison with the quantities of light reactive ink post metering.

* * * * *